US009865862B2

(12) United States Patent
Ok

(10) Patent No.: US 9,865,862 B2
(45) Date of Patent: Jan. 9, 2018

(54) SAFETY MATERIAL AND SYSTEM

(71) Applicant: Victoria Link Limited, Wellington (NZ)

(72) Inventor: Jeongbin Ok, Wellington (NZ)

(73) Assignee: Victoria Link Limited, Wellington (NZ)

(*) Notice: Subject to any disclaimer, the term of this patent is extended or adjusted under 35 U.S.C. 154(b) by 0 days.

(21) Appl. No.: 14/935,243

(22) Filed: Nov. 6, 2015

(65) Prior Publication Data

US 2016/0211501 A1    Jul. 21, 2016

Related U.S. Application Data

(62) Division of application No. 13/825,031, filed as application No. PCT/NZ2011/000196 on Sep. 21, 2011, now abandoned.

(51) Int. Cl.
| | |
|---|---|
| *H01M 2/34* | (2006.01) |
| *H01M 2/02* | (2006.01) |
| *C09D 7/12* | (2006.01) |
| *C09D 7/00* | (2006.01) |

(52) U.S. Cl.
CPC .............. *H01M 2/34* (2013.01); *C09D 7/007* (2013.01); *C09D 7/12* (2013.01); *C09D 7/1233* (2013.01); *H01M 2/0222* (2013.01); *H01M 2200/00* (2013.01); *H01M 2220/30* (2013.01)

(58) Field of Classification Search
CPC .. H01M 2/0222; H01M 2200/00; H01M 2/34; C09D 7/12
See application file for complete search history.

(56) References Cited

U.S. PATENT DOCUMENTS

| | | | |
|---|---|---|---|
| 5,149,560 A | 9/1992 | Kealey | |
| 5,352,279 A | 10/1994 | Fusi | |
| 5,571,528 A | 11/1996 | Lee | |
| 5,906,834 A | 5/1999 | Tseng | |
| 5,968,540 A | 10/1999 | Brenner | |
| 6,143,440 A * | 11/2000 | Volz | H01M 2/1044 429/100 |
| 6,160,034 A | 12/2000 | Allison | |
| 6,235,217 B1 | 5/2001 | Turcotte | |
| 6,290,985 B2 | 9/2001 | Ream | |
| 6,376,147 B1 | 4/2002 | Bonsignore | |
| 7,611,787 B2 | 11/2009 | Yang | |
| 2005/0008735 A1 | 1/2005 | Pearce | |
| 2006/0014724 A1 | 1/2006 | Jadhav | |
| 2006/0049167 A1 | 3/2006 | Yang | |
| 2006/0051639 A1 | 3/2006 | Yang | |
| 2006/0063050 A1 | 3/2006 | Yang | |
| 2006/0246149 A1 | 11/2006 | Buchholz et al. | |
| 2008/0209650 A1 | 9/2008 | Brewer | |
| 2008/0311008 A1 | 12/2008 | Tranzeat | |
| 2010/0092823 A1 | 4/2010 | Yang | |

FOREIGN PATENT DOCUMENTS

| | | |
|---|---|---|
| AU | 2005904602 | 8/2005 |
| AU | 2006100239 | 3/2006 |
| AU | 2006203603 A1 | 8/2006 |
| GB | 2254806 A * | 10/1992 |
| GB | 2331702 A | 6/1999 |
| JP | 59-029353 | 2/1984 |
| JP | 59-051455 | 3/1984 |
| JP | S59044762 A | 3/1984 |
| JP | 59211955 A | 11/1984 |
| JP | 1996-206368 A | 8/1996 |
| JP | 1997-192580 A | 7/1997 |
| WO | 2007022563 A1 | 3/2007 |

OTHER PUBLICATIONS

International Preliminary Report on Patentability dated Sep. 25, 2012 and Written Opinion dated May 4, 2012, regarding PCT/NZ2011/000196.
International Search Report dated May 4, 2012 regarding PCT/NZ2011/000196.
Supplementary European Search Report and Written Opinion mailed Jan. 5, 2015, regarding European Patent Application EP11827034.7.
Notification of Reason for Rejection dated Jul. 28, 2015, regarding Japanese Patent Application JP2013-530108, and English translation.
A Zosel: "Adhesion and tack of polymers: Influence of mechanical properties and surface tensions", Colloid and Polymer Science, 263, 7 (1985) 541-553.
M J Shenton, M C Lovell-Hoare and G C Stevens: "Adhesion enhancement of polymer surfaces by atmospheric plasma treatment," Journal of Physics D: Applied Physics 34 (2001) 2754-2760.
J. van den Brand, S. Van Gils, P.C.J. Beentjes, H. Terryn, V. Sivel, and J.H.W. de Wit: "Improving the adhesion between epoxy coatings and aluminium substrates," Progress in Organic Coatings 51 (2004) 339-350.
Jason R. Stokes and Georgina A. Davies: "Viscoelasticity of human whole saliva collected after acid and mechanical stimulation," Biorheology, 44 (2007) 141-160.
Nehal Siddiqui, Garima Garg and Pramod Kumar Sharma: "A Short Review on a Novel Approach in Oral Fast Dissolving Drug Delivery System and Their Patents," Advances in Biological Research 5 (6): 291-303, 2011.
Daniel J Dire: "Disk Battery Ingestion," http://emedicine.medscape.com/article/774838-overview.
Toby Litovitz, Nicole Whitaker and Lynn Clark: "Preventing Battery Ingestions: An Analysis of 8648 Cases," Pediatrics 2010;125;1178-1183, Doi: 10.1542/peds.2009-303.
Toby Litovitz, Nicole Whitaker, Lynn Clark, Nicole C. White and Melinda Marsolek: "Emerging Battery-Ingestion Hazard: Clinical Implications," Pediatrics 2010;125;1178-1183, originally published online May 24, 2010; DOI: 10.1542/peds.2009-3038.
EP Communication dated Feb. 23, 2017 regarding EP11827034.7, and Annex attached.

* cited by examiner

*Primary Examiner* — Robert Cabral
(74) *Attorney, Agent, or Firm* — Arent Fox LLP

(57) ABSTRACT

Compositions and methods for deterring and/or visually identifying oral contact with objects that are hazardous upon oral contact or ingestion are disclosed. The compositions generally comprise a colorant and a carrier and may further comprise an aversive agent, a salivating agent, and/or an emetic. The compositions may be particularly useful for application to batteries, including button cells.

16 Claims, 1 Drawing Sheet

SAFETY MATERIAL AND SYSTEM

CROSS-REFERENCE TO RELATED APPLICATIONS

This application is a Division of application Ser. No. 13/825,031 entitled "SAFETY MATERIAL AND SYSTEM," filed Jun. 18, 2013 which is a 371 of International Application No. PCT/NZ2011/000196, also entitled "SAFETY MATERIAL AND SYSTEM," and filed Sep. 21, 2011, each of which are expressly incorporated as if fully set forth herein, in their entirety.

TECHNICAL FIELD

The present invention relates to safety features for addition to or inclusion in common household items that may be accidentally ingested. More specifically, the present invention relates to compositions and methods for deterring and/or visually identifying oral contact or ingestion.

BACKGROUND ART

The prevalence of electronic devices, such as watches, remotes, hearing aids, and toys, has provided unprecedented convenience and amusement to our life in many ways. It is significantly attributed to button cells. The global market for these thin, portable, and affordable power sources keeps expanding and is expected to exceed US$1.77 billion by 2014 from US$1.1 billion in 2007.

Peril from the tiny batteries has become more widespread as button cells become more popular in the household. Serious injuries by accidental ingestion, in particular by children, have been seen, such as persistent drooling, choking, and even death. More than 3,500 cases of button cell ingestion are reported annually in the US, and the rising severity of the danger has motivated the US and Australian governments to set up hotlines and websites dedicated to the accidents.

In most cases of battery ingestion no perceivable signs or symptoms are observed from the victim until serious health problems occur. Moreover, no information about the swallowed battery (such as voltage) is available, which makes it extremely difficult to recognise the accident and give medical treatment in a timely and appropriate way.

To date, no practical answer which will prevent children from swallowing batteries has been devised. Various measures have been suggested in order to reduce the possibility of accidental swallowing of foreign objects, such as warning labels or screw-fastened battery compartments, but these have not been effective in terms of child protection. As the majority of the accidents happen when the victim picks up and ingests a battery that has been left unattended after removal from its original package or from a battery compartment, or when a battery is incorrectly disposed of after use, these conventional suggestions have fundamental limitations as child protection measures.

JP 1996-206368 suggests a method of adding a semi-permeable coat layer onto the surface of small objects by dipping the objects in a bath of embittering emetic solution for the prevention of mistaken ingestion.

JP 1997-192580 suggests a pen-type applicator of embittering emetic liquid for home use.

WO 2007/022563 along with AU 2006100239 and AU 2005904602 describes a taste aversive composition and packaging.

The prior art suggests methods for the prevention of mistaken ingestion of objects having a potential hazard, however the inclusion of additional processes may cause a significant cost rise in manufacturing and there is a risk of abuse or misuse of mixtures of chemicals in a consumer product. Moreover, the prior art does not provide any means of visual indication of the ingestion and identification of the objects.

It is therefore an object of the present invention to ameliorate these deficiencies; and/or to at least provide the public with a useful choice.

Other features of the invention may become apparent from the following description which is given by way of example only.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

The present invention relates to a material composition for application onto an item such as a battery, where the material comprises an aversive agent and a food colourant.

Preferably the material also includes an emetic.

Preferably the emetic is blended with a carrier.

The present invention further relates to a composition of ingestive material comprising more than one of following components: aversive agent, food colour, salivating agent, emetic, and carrier, wherein the specific electrical resistance and overall viscosity of the material are higher than $1.0\times10^3$ $\Omega\cdot m$ and $2.0\times10^{-5}$ Pa·s, respectively, at 20° C.

The present invention further relates to a method of the prevention of ingestion of potentially hazardous objects, the method comprising the steps of:

applying the material as described above, where the aversive agent discourages the swallowing of the object and the emetic induces vomiting in order to minimise the possibility of swallowing and further related hazards.

The present invention further relates to a method of visual recognition of an ingested object, where the method comprises:

when ingested, a food colour applied to the object dissolves in the mouth and stains the mouth area promptly in order to give an easily visible warning to other people and a salivating agent may promote it.

The present invention further relates to a method of identification of ingested objects, where a specific food colour is assigned to a kind of potentially hazardous object in order to give information about the object for prompt medical treatment.

The present invention further relates to an item, such as a button cell, where the item is coated in insulation, the insulation being made of or coated by the material above-mentioned in order to prevent accidental and intentional ingestion.

The present invention further relates to a battery coated with a material containing an emetic, an aversive agent or a colourant as described above.

More specifically, in a first aspect, the present invention provides a composition for application onto an object, wherein the composition comprises an aversive agent, a colourant, and a salivating agent.

In some embodiments, the composition further comprises one or more of a carrier and an emetic.

In a second aspect, the present invention provides a composition comprising a colourant and a carrier, wherein the specific electrical resistance and overall viscosity of the composition are higher than $1.0\times10^3$ $\Omega\cdot$m and $2.0\times10^{-5}$ Pa·s, respectively, at 20° C.

In some embodiments the composition further comprises one or more of a salivating agent, an aversive agent, and an emetic.

In a third aspect, the present invention provides a taste aversive composition comprising a colourant, an aversive agent, and a carrier.

In some embodiments the composition further comprises a salivating agent and/or an emetic.

In a fourth aspect, the present invention provides a composition for application to an object, wherein the composition comprises a colourant and a carrier, wherein the object is hazardous upon oral contact or ingestion, and wherein upon contact of the object with saliva, the colourant stains the saliva.

In some embodiments, the composition further comprises one or more of a salivating agent, an aversive agent, and an emetic.

In some embodiments of the second to fourth aspects, the composition is for application to an object.

In some embodiments of the first to third aspects, the object is hazardous upon oral contact or ingestion.

In a fifth aspect, the present invention provides a composition for application to or incorporation in an object, wherein the composition comprises a colourant, a salivating agent and a carrier, wherein the object is hazardous upon oral contact or ingestion, and wherein upon contact of the object with saliva, the colourant stains the saliva.

In some embodiments the composition further comprises an aversive agent and/or an emetic.

In some embodiments the composition further comprises an aversive agent.

In a sixth aspect, the present invention provides a method of preventing oral contact or ingestion of an object that is hazardous upon oral contact or ingestion comprising coating at least a portion of the external surface of the object with a composition as defined in any one of the first to fifth aspects.

In a seventh aspect, the present invention provides a method of visually identifying oral contact with an object that is hazardous upon oral contact or ingestion, comprising coating at least a portion of the external surface of the object with a composition as defined in any one of the first to fifth aspects, wherein upon oral contact with the object the composition releases the colourant and stains the oral area.

In an eighth aspect, the present invention provides an object that is hazardous upon oral contact or ingestion having on at least a portion of its external surface a composition as defined in any one of the first to fifth aspects.

In a ninth aspect, the present invention provides an object that is hazardous upon oral contact or ingestion having incorporated in a component of the object, at least a portion of which is exposed to moisture upon immersion of the object, a composition as defined in any one of the first to fifth aspects.

In some embodiments, the object is a battery.

In some embodiments, the object is a button cell.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

In addition, where features or aspects of the invention are described in terms of Markush groups, those persons skilled in the art will appreciate that the invention is also thereby described in terms of any individual member or subgroup of members of the Markush group.

As used herein "(s)" following a noun means the plural and/or singular forms of the noun.

As used herein the term "and/or" means "and" or "or" or both.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

Although the present invention is broadly as defined above, those persons skilled in the art will appreciate that the invention is not limited thereto and that the invention also includes embodiments of which the following description gives examples.

BRIEF DESCRIPTION OF THE FIGURE

Preferred embodiments of the invention will now be described with reference to the accompanying drawing in which:

FIG. 1 shows a sectional view of a button cell to which a composition of the invention has been applied.

DETAILED DESCRIPTION OF INVENTION

The present invention is described in relation to a composition for coating objects such as button cells, but those skilled in the art will appreciate the invention can be applied to other objects that may be placed in the mouth and, particularly, objects that may be ingested.

The invention particularly relates to objects that are hazardous upon oral contact or ingestion. Such hazards include, but are not limited to, physical hazards such as choking, and other hazards such as persistent drooling, poisoning and internal burns and, in extreme circumstances, death.

The composition provided herein is useful for the prevention and identification of the ingestion of potentially hazardous objects. In some embodiments, the composition comprises some or all of the following components: i) aversive agent, ii) food colour, iii) salivating agent, and iv) emetic, in order to discourage the intentional or mistaken ingestion of items quickly and effectively.

The aversive agent provides offensive and obstructive flavours such as bitterness or pungency by releasing corresponding taste and odour in the mouth so that it helps the potential victim to abandon the ingestion, especially when applied to or incorporated in an object having a potential health hazard. The aversive agent may comprise one or more chemicals. In some embodiments, the overall content of the aversive agent portion is preferably less than about 10 percent of the composition by dry weight, preferably about 0.5 to about 1 percent of the composition by dry weight, however this may vary depending on the recommended dose of the specific aversive agent(s).

In some embodiments, the aversive agent includes at least one of following chemicals: ammonium benzoate, denatonium benzoate, denatonium saccharide, denatonium chloride, sucrose octaacetate, 2,3-dimethoxystrychnine, quassinoids, flavonoids, including quercetin, absinthin, resinferatoxin, capsaicin, nonivamide, piperine, and allyl isothiocyanate or any other known aversive agent.

In some embodiments, the aversive agent includes at least one of following chemicals: ammonium benzoate, denatonium benzoate, denatonium saccharide, denatonium chloride, sucrose octaacetate, 2,3-dimethoxystrychnine, quassinoids, flavonoids, absinthin, resinferatoxin, capsaicin, piperine, and allyl isothiocyanate.

In some preferred embodiments, the aversive agent is selected from bitterants, such as sucrose octaacetate, ammonium benzoate, denatonium benzoate, denatonium saccharide and quercetin, and pungents, such as capsaicin and nonivamide, and mixtures of any two or more thereof.

Suitable colourants include food colourants. In some embodiments, the colourant is selected from the group consisting of: FD&C Red 40; Red 3; D&C Black 3; Black 2; Mica-based pearlescent pigment; FD&C Yellow 6; Green 3; Blue 1; Blue 2; titanium dioxide (food grade); and mixtures of any two or more thereof.

The colourant preferably smudges the area in and around a mouth promptly and vividly by releasing a preferably highly soluble colour from the composition immediately after the object is put into the mouth or is otherwise contacted with saliva. This provides a visual warning so that parents or other eyewitnesses notice the accident and can take further appropriate measures immediately, such as removing the object from the mouth. The blotted food colour may also make it easier to find the object if it has not been swallowed by the victim.

The composition preferably also releases the colourant on contact with any other body part that is moist with saliva, such as a child's hand that has been placed in the mouth. The colourant will then stain the saliva and the body part. In this way, the child's parents or other eyewitnesses can take appropriate action, such as removing the object from the child to prevent further oral contact or ingestion.

In some embodiments, the colourant can be selected to give an indication to first aid and medical treatment personnel, enabling the recognition and identification of the ingested object. This embodiment contemplates the use of a colour-coding system, which exclusively assigns a colour to a specific kind or category among various objects. Advantageously, such a colour-coding system may permit the selection of the appropriate medical treatment following recognition and identification of the ingested object.

The colourant may comprise a single colourant. In some embodiments, the colourant comprises more than one colourant. In some embodiments, the overall content of the colourant is preferably about 5 to about 70 percent of the composition by dry weight, more preferably about 5 to about 10 percent of the composition by dry weight, however this may vary depending on the recommended dose of the specific colourant(s).

In some embodiments, the composition further comprises a salivating agent. This preferably promotes the secretion of saliva by stimulating the sympathetic and parasympathetic nervous systems. The colourant can then be seen more easily and the visual warning is more readily recognised as increased saliva production occurs upon oral contact.

In some embodiments, the salivating agent comprises at least one of following chemicals: adipic, ascorbic, citric, fumaric, lactic, malic and tartaric acids; alkyl aryl sulfonates, alkyl sulfates, sulfonated amides and amines, sulfated and sulfonated esters and ethers, alkyl sulfonates, polyethoxlyated esters, mono- and diglycerides, diacetyl tartaric esters of monoglycerides, polyglycerol esters, sorbitan esters and ethoxylates, lactylated esters, or phospholipids such as lecithin, polyoxyethylene sorbitan esters, proplyene glycol esters, and sucrose esters.

In some preferred embodiments, the salivating agent comprises citric acid, tartaric acid or a mixture thereof.

The composition may comprise more than one salivating agent. The overall content of the salivating agent is preferably less than about 10 percent of the composition by dry weight, more preferably about 2 to about 6 percent of the composition by dry weight, however this may vary depending on the recommended dose of the specific salivating agent(s).

In some embodiments, the composition comprises an emetic. The emetic may induce vomiting by releasing a chemical which irritates gastric mucosa or stimulates the medullary chemoreceptor trigger zone. Advantageously, the emetic promotes the instant removal of the object from the victim's body, especially when applied to an object having a potential health hazard. The emetic may comprise one or more chemicals. The overall content of the emetic is preferably less than 10 percent of the composition by dry weight, however this may vary depending on the recommended dose of the specific emetic(s).

In some embodiments, the emetic comprises at least one of the following chemicals: syrup of ipecac, 10-chloro-5,10-dihydroarsacridine, 10-chloro-5,10-dihydrophenarsazine, 5-aza-10-arsenaanthracene chloride, diphenylaminechlorarsine, diphenylaminearsine chloride, diphenylcyanarsine, and phenyldichloroarsine.

The abovementioned components of the composition are generally blended with a carrier, depending on the potential application. The carrier aids in the adhesion of the composition to an object and may improve the workability of the composition, such as the flowability and the viscosity, to aid in application to an object.

In some embodiments, the carrier comprises about 5 to about 90 percent of the composition by dry weight, preferably about 80 to about 90 percent, more preferably about 85 to about 90 percent, of the composition by dry weight.

In some embodiments, the carrier comprises a monosaccharide, a disaccharide, a polysaccharide or a mixture of any two or more thereof. Such saccharides are preferably readily soluble in human saliva for a faster action. In some embodiments, the carrier comprises an amylase-reactive agent. In some embodiments, the amylase-reactive agent is modified corn starch, such as a crosslinked and stabilised corn starch. Advantageously, modified corn starch improves the selectivity of the composition towards saliva compared to other liquids, improving the resistance of the composition to other ambient and/or contiguous liquids, such as moisture, humidity and sweat, which may otherwise affect the durability and performance of the composition.

In some embodiments, the composition comprises about 10 to about 65 percent, preferably about 10 to about 40 percent, of modified starch by dry weight.

The carrier may comprise other components in addition to the monosaccharide, disaccharide and/or polysaccharide. In some embodiments, the carrier may comprise a thickening agent. Suitable thickening agents include, but are not limited to, xanthan gum, gum arabic and mixtures thereof.

In some embodiments, the composition comprises about 1 to about 10 percent, preferably about 1 to about 5 percent, of xanthan gum and/or gum arabic by dry weight.

The carrier may also comprise an adhesion enhancer. The adhesion enhancer improves adhesion of the composition to an object and may also improve the resistance of the composition to other ambient and/or contiguous liquids, such as moisture, humidity and sweat, which may otherwise affect the durability and performance of the composition. Suitable adhesion enhancers include, but are not limited to, ethyl cellulose, polyvinyl acetate, polyvinyl alcohol and mixtures of any two or more thereof.

In some embodiments, the ethyl cellulose comprises about 48-50% of ethoxy groups.

In some embodiments, the composition comprises about 40 to about 75 percent of adhesion enhancer by dry weight.

The carrier may comprise a preservative. Suitable preservatives include, but are not limited to sodium benzoate, potassium sorbate and mixtures thereof.

The carrier may comprise a stabiliser. Suitable stabilisers include, but are not limited to pentaerythritol tetrakis(3-(3,5-di-tert-butyl-4-hydroxyphenyl)propionate), tris(2,4-di-tert-butylphenyl)phosphite and poly(4-hydroxy-2,2,6,6-tetramethyl-1-piperidine ethanol-alt-1,4-butanedioic acid) and mixtures of any two or more thereof.

The carrier may comprise a solvent. Suitable solvents include, but are not limited to, ethyl alcohol, ethyl acetate, t-butyl alcohol, water and mixtures of any two or more thereof.

In some embodiments, the present invention provides a composition for application to or incorporation in an object, wherein the composition comprises about 5 to about 10 percent of the composition by dry weight of a colourant, about 2 to about 6 percent of the composition by dry weight of a salivating agent and about 80 to about 90 percent of the composition by dry weight of a carrier, wherein the object is hazardous upon oral contact or ingestion, and wherein upon contact of the object with saliva, the colourant stains the saliva.

Preferably, the carrier comprises modified corn starch.

Preferably, the carrier further comprises xanthan gum or gum arabic.

In some embodiments, the carrier further comprises ethyl cellulose. In other embodiments, the carrier further comprises polyvinyl acetate. In other embodiments, the carrier further comprises ethyl cellulose, polyvinyl acetate and polyvinyl alcohol.

In some embodiments, the carrier further comprises a preservative. Preferably, the preservative comprises sodium benzoate and potassium sorbate.

In some embodiments, the carrier further comprises a stabiliser. Preferably, the stabiliser comprises pentaerythritol tetrakis(3-(3,5-di-tert-butyl-4-hydroxyphenyl)propionate), tris(2,4-di-tert-butylphenyl)phosphite and poly(4-hydroxy-2,2,6,6-tetramethyl-1-piperidine ethanol-alt-1,4-butanedioic acid).

Preferably, the salivating agent is a mixture of citric acid and tartaric acid.

In some embodiments the composition further comprises about 0.5 to about 1 percent of the composition by dry weight of an aversive agent. Preferably, the aversive agent is selected from the group consisting of sucrose octaacetate, ammonium benzoate, denatonium benzoate, denatonium saccharide, quercetin, capsaicin and nonivamide.

The composition may be applied to an object by any conventional means, using, for example, a sprayer, roller or brush. After application, the composition may be dried by at least partially evaporating the solvent from the composition. The solvent may be evaporated at ambient temperature or may be accelerated by placing the coated object in a warm environment.

The composition is typically applied to at least a portion of the external surface of the object. In some embodiments, the composition is incorporated in a component of the object, at least a portion of which is exposed to moisture upon immersion of the object.

When applied to a button cell, such as is seen in FIG. 1, the composition may conveniently be placed on the existing insulation of the battery or incorporated in the insulation of the battery. In FIG. 1, there is shown an anode (electrode) (1), an anode (electrolyte) (2), insulation (including the composition of the invention) (3), a separator (4), a cathode (electrolyte) (5) and another cathode (electrode) (6).

In some embodiments, the composition may be applied to the button cell as an additional layer in the manufacturing process. In other embodiments, the composition may be integrated with the insulation by compounding with non-conductive polymer materials such as rubbers including NR (natural rubber), NBR (nitrile-butadiene rubber), and EPDM (ethylene-propylene diene monomer), EVA (ethylene-vinyl acetate copolymer), polyethylene, and polypropylene.

Regardless of whether the composition is applied to the button cell as an additional layer or integrated with the insulation, the colourant can provide a distinctive indication of battery ingestion and moreover a visual identification of the specific type of battery by, for example, applying different colours to different kinds of batteries. The colour may be selected to indicate the voltage of the battery, for example, because batteries having a higher voltage can cause more serious health hazards.

The following non-limiting examples are provided to illustrate the present invention and in no way limit the scope thereof.

EXAMPLES

Colour Composition

Example 1

60 g of modified (crosslinked and stabilized) corn starch and 7.5 g of xanthan gum were slowly poured into 200 ml of heated (60° C.) solvent solution (90 ml of ethyl alcohol, 90 ml of ethyl acetate and 20 ml of distilled water) and mixed thoroughly using a mechanical stirrer until the overall mixture became slightly viscous. 50 g of ethyl cellulose (48-50% of ethoxy groups), 10 g of polyvinyl acetate and 6 g of polyvinyl alcohol were added into the mixture and stirred well for 5 minutes. 5 g of anhydrous citric acid, 1 g of tartaric acid, 9 g of colour, 0.02 g of sodium benzoate, 0.01 g of potassium sorbate, 0.03 g of pentaerythritol tetrakis(3-(3,5-di-tert-butyl-4-hydroxyphenyl)propionate), 0.12 g of tris(2,4-di-tert-butylphenyl)phosphite and 0.03 g of poly(4-hydroxy-2,2,6,6-tetramethyl-1-piperidine ethanol-alt-1,4-butanedioic acid) were slowly introduced and mixed well.

After a thorough blending, the overall pH of the mixture was adjusted to be in the range of 6.7-6.9. If the mixture was too acidic, a small amount of sodium hydroxide solution (0.1 M) was carefully titrated to adjust the pH.

The colours were selected from the following:
Red: FD&C Red 40, Red 3
Black: D&C Black 3, Black 2
Gold: Mica-based pearlescent pigment, FD&C Yellow 6
Green: Green 3
Blue: Blue 1, Blue 2
White: Titanium dioxide (food grade)

The colour compositions in Tables 1.1 and 1.2 were prepared following the procedure described above for Example 1.

TABLE 1.1

Colour compositions

| | 1 | 2 | 3 | 4 | 5 | 6 |
|---|---|---|---|---|---|---|
| Colour | 9 g | 9 g | 9 g | 9 g | 9 g | 9 g |
| Modified corn starch | 60 g | 60 g | 60 g | 60 g | 30 g | 30 g |
| Xanthan gum | 7.5 g | | | | 3 g | 3 g |
| Gum arabic | | 7.5 g | 7.5 g | 7.5 g | | |
| Ethyl cellulose | 50 g | 50 g | 50 g | 50 g | 50 g | 50 g |
| Polyvinyl acetate | 10 g | 10 g | 10 g | 10 g | | |
| Polyvinyl alcohol | 6 g | 6 g | 6 g | 6 g | | |
| Citric acid (anhydrous) | 5 g | 5 g | 5 g | 5 g | 3 g | 1 g |
| Tartaric acid | 1 g | 1 g | 1 g | 1 g | 1 g | 1 g |
| Ethyl alcohol | 90 ml | 90 ml | 90 ml | 90 ml | 100 ml | 100 ml |
| Ethyl acetate | 90 ml | 90 ml | 90 ml | 90 ml | 100 ml | 100 ml |
| Distilled Water | 20 ml | 20 ml | 20 ml | 20 ml | | |
| t-Butyl alcohol | | | | | | |
| Sodium benzoate | 0.02 g | 0.02 g | 0.02 g | 0.02 g | | |
| Potassium sorbate | 0.01 g | 0.01 g | 0.01 g | 0.01 g | | |
| Pentaerythritol Tetrakis(3-(3,5-di-tert-butyl-4-hydroxyphenyl)propionate) | 0.03 g | 0.03 g | 0.03 g | 0.03 g | | |
| Tris(2,4-di-tert-butylphenyl)phosphite | 0.12 g | 0.12 g | 0.12 g | 0.12 g | | |
| Poly(4-hydroxy-2,2,6,6-tetramethyl-1-piperidine ethanol-alt-1,4-butanedioic acid) | 0.03 g | 0.03 g | 0.03 g | 0.03 g | | |
| Sucrose octaacetate or ammonium benzoate or denatonium benzoate or denatonium saccharide or quercetin | | | | 1 g | | |
| Capsaicin or nonivamide | | | | 1 g | | |
| Colour strength (immersion in artificial saliva) | strong | strong | strong | strong | strong | strong |
| Adhesion strength (peeled off an adhesive tape piece) | strong | strong | strong | strong | strong | strong |
| Tackiness | high | high | high | high | med-hi | med-hi |
| Colourfastness to moisture (rubbed lightly with a damp cloth) | high | high | high | high | high | high |

TABLE 1.2

Colour compositions

| | 7 | 8 | 9 | 10 | 11 | 12 |
|---|---|---|---|---|---|---|
| Colour | 5 g | 5 g | 5 g | 5 g | 5 g | 5 g |
| Modified corn starch | 30 g | 30 g | 10 g | 10 g | 5 g | |
| Xanthan gum | 3 g | 3 g | 1 g | 1 g | 1 g | |
| Gum arabic | | | | | | |
| Ethyl cellulose | 50 g | | | | | |
| Polyvinyl acetate | | | 50 g | 50 g | | |
| Polyvinyl alcohol | | | | | | |
| Citric acid (anhydrous) | 3 g | 3 g | 3 g | | | |
| Tartaric acid | 1 g | 1 g | 1 g | | | |
| Ethyl alcohol | 50 ml | 150 ml | 150 ml | 150 ml | 150 ml | 150 ml |
| Ethyl acetate | 150 ml | 50 ml | | | | |
| Distilled Water | | | | | | |
| t-Butyl alcohol | | | | 50 ml | | |
| Sodium benzoate | | | | | | |
| Potassium sorbate | | | | | | |
| Pentaerythritol Tetrakis(3-(3,5-di-tert-butyl-4-hydroxyphenyl)propionate) | | | | | | |
| Tris(2,4-di-tert-butylphenyl)phosphite | | | | | | |
| Poly(4-hydroxy-2,2,6,6-tetramethyl-1-piperidine ethanol-alt-1,4-butanedioic acid) | | | | | | |
| Sucrose octaacetate or ammonium benzoate or denatonium benzoate or denatonium saccharide or quercetin | | | | | | |
| Capsaicin or nonivamide | | | | | | |
| Colour strength (immersion in artificial saliva) | med-hi | med-hi | med-hi | med-hi | med-hi | med-hi |

TABLE 1.2-continued

| | Colour compositions | | | | | |
|---|---|---|---|---|---|---|
| | 7 | 8 | 9 | 10 | 11 | 12 |
| Adhesion strength (peeled off an adhesive tape piece) | strong | strong | strong | strong | medium | low |
| Tackiness | med-hi | med-hi | medium | med-lo | low | low |
| Colourfastness to moisture (rubbed lightly with a damp cloth) | high | high | med-hi | med-hi | medium | low |

Application

The colour composition was applied onto the surface of a button cell except for a circular area in the centre with a diameter of 12-14 mm. The composition was applied by a sprayer, roller or brush. If necessary, the battery could be kept in a warm atmosphere for a while to achieve complete drying of the colour composition. The colour composition was applied to give a layer not exceeding 0.2 mm in thickness. The weight increase of the battery due to the colour composition (after drying) did not exceed 0.1 g Advantageously, the colour releasing feature may give an immediate visual warning to nearby people in case of ingestion of a coated button cell and assist medical staff to identify the swallowed button cell.

Immersion

A "modified" button cell and an "untreated" one were immersed in 150 ml of artificial saliva separately, prepared in accordance with DIN 53160-1:2010-10 specification (Table 2), to simulate ingestion.

TABLE 2

| Composition of artificial saliva | |
|---|---|
| Reagents | Mass fraction (g/l) |
| Magnesium chloride ($MgCl_2 \cdot 6H_2O$) | 0.17 |
| Calcium chloride ($CaCl_2 \cdot 2H_2O$) | 0.15 |
| Dipotassium hydrogen phosphate ($K_2HPO_4 \cdot 3H_2O$) | 0.76 |
| Potassium carbonate ($K_2CO_3$) | 0.53 |
| Sodium chloride (NaCl) | 0.33 |
| Potassium chloride (KCl) | 0.75 |

1% (m/m) Hydrochloric acid was added until a pH value of 6.8 ± 0.1 was achieved.

The colourant was quickly diffused in the artificial saliva within a few seconds after immersion.

The embodiments of the invention described above are intended to be merely exemplary, and those skilled in the art will recognise, or will be able to ascertain using no more than routine experimentation, numerous equivalents of specific materials, compounds, and procedures. All such equivalents are considered to be within the scope of the invention as set out in the accompanying claims.

I claim:

1. A battery comprising:
    a battery having an external surface or a component, the external surface or the component having at least a portion that is exposed to moisture upon immersion of the battery; and
    a composition comprising:
       an aversive agent;
       a releasable colorant; and
       a salivating agent,
    wherein the composition is coated onto the external surface or is incorporated into the component wherein the specific electrical resistance and overall viscosity of the composition are higher than $1.0 \times 10^3$ Ω·m and $2.0 \times 10^{-5}$ Pa·s, respectively, at 20° C.

2. The battery of claim 1, wherein the composition further comprises a carrier.

3. The battery of claim 2, wherein the carrier comprises a monosaccharide, a disaccharide, a polysaccharide, or mixtures thereof.

4. The battery of claim 1, wherein the aversive agent comprises a chemical selected from group consisting of ammonium benzoate, denatonium benzoate, denatonium saccharide, denatonium chloride, sucrose octaacetate, 2,3-dimethoxystrychnine, quassinoids, flavonoids, including quercetin, absinthin, resinferatoxin, capsaicin, nonivamide, piperine, allyl isothiocyanate and mixtures thereof.

5. The battery of claim 1, wherein the releasable colorant is selected from the group consisting of FD&C Red 40; Red 3; D&C Black 3; Black 2; Mica-based pearlescent pigment; FD&C Yellow 6; Green 3; Blue 1; Blue 2; titanium dioxide; and mixtures thereof.

6. The battery of claim 1, wherein the salivating agent comprises a chemical selected from the group consisting of adipic acid, ascorbic acid, citric acid, fumaric acid, lacticacid, malic acid, tartaric acid, alkyl aryl sulfonates, alkyl sulfates, sulfonated amides, sulfonated amines, sulfated esters, sulfonated esters sulfated ethers, sulfonated ethers, alkyl sulfonates, polyethoxlyated esters, monoglycerides, diglycerides, diacetyl tartaric esters of monoglycerides, polyglycerol esters, sorbitan esters, ethoxylates, lactylated esters, phospholipids, polyoxyethylene sorbitan esters, proplyene glycol esters, sucrose esters, and mixtures thereof.

7. The battery of claim 1, wherein the composition as further comprises an emetic.

8. The battery of claim 7, wherein the emetic comprises a chemical selected from the group consisting of syrup of ipecac, 10-chloro-5,10-dihydroarsacridine, 10-chloro-5,10-dihydrophenarsazine, 5-aza-10-arsenaanthracene chloride, diphenylaminechlorarsine, diphenylaminearsine chloride, diphenylcyanarsine, phenyldichloroarsine, and mixtures thereof.

9. The battery of claim 1, wherein the battery is a button cell.

10. The battery of claim 9, wherein the component is an insulation of the button cell.

11. A method of visually identifying oral contact with a battery, comprising:
    coating an external surface of a battery with a composition or incorporating the composition into a component of the battery, the external surface or the component having at least a portion that is exposed to moisture upon immersion of the battery, the composition comprising:
       an aversive agent;
       a releasable colorant; and
       a salivating agent; and releasing the colorant upon contacting of the composition with an oral area to stain the oral area wherein the specific electrical resistance and overall viscosity of the composition are higher than $1.0 \times 10^3$ Ω•m and $2.0 \times 10^{-5}$ Pa•s, respectively, at 20° C.

12. The method of claim 11, wherein the battery is a button cell.

13. The method of claim 11, further comprising correlating the color of the stained oral area with an external reference to identify the battery.

14. A method of preventing ingestion of a battery that is hazardous upon ingestion, comprising:
  coating an external surface of a battery with a composition or incorporating the composition into a component of the battery, the external surface or the component having at least a portion that is exposed to moisture upon immersion of the battery, the composition comprising:
    an aversive agent;
    a releasable colorant; and
    a salivating agent; and
  releasing the aversive agent upon contacting of the composition with an oral area to impart an offensive flavor and/or odor to the oral area wherein the specific electrical resistance and overall viscosity of the composition are higher than $1.0 \times 10^3$ Ω•m and $2.0 \times 10^{-5}$ Pa•s, respectively, at 20° C.

15. The method of claim 14, wherein the battery is a button cell.

16. The method of claim 14, further comprising removing the battery from oral area.

\* \* \* \* \*

UNITED STATES PATENT AND TRADEMARK OFFICE
CERTIFICATE OF CORRECTION

| | | |
|---|---|---|
| PATENT NO. | : 9,865,862 B2 | Page 1 of 1 |
| APPLICATION NO. | : 14/935243 | |
| DATED | : January 9, 2018 | |
| INVENTOR(S) | : Jeongbin Ok | |

It is certified that error appears in the above-identified patent and that said Letters Patent is hereby corrected as shown below:

On the Title Page

Insert the following:
-- (30) Foreign Application Priority Data
Sep. 21, 2010   (NZ) ............................ 588100 --.

Signed and Sealed this
Fourth Day of December, 2018

Andrei Iancu
*Director of the United States Patent and Trademark Office*